(12) United States Patent
Rönkkö et al.

(10) Patent No.: US 11,279,777 B2
(45) Date of Patent: Mar. 22, 2022

(54) CATALYSTS

(71) Applicant: BOREALIS AG, Vienna (AT)

(72) Inventors: Hanna-Leena Rönkkö, Porvoo (FI);
Kumudini Jayaratne, Porvoo (FI);
Timo Leinonen, Tolkkinen (FI); Peter Denifl, Linz (AT)

(73) Assignee: Borealis AG, Vienna (AT)

( * ) Notice: Subject to any disclaimer, the term of this patent is extended or adjusted under 35 U.S.C. 154(b) by 0 days.

(21) Appl. No.: 16/638,894

(22) PCT Filed: Oct. 23, 2018

(86) PCT No.: PCT/EP2018/079062
§ 371 (c)(1),
(2) Date: Feb. 13, 2020

(87) PCT Pub. No.: WO2019/081529
PCT Pub. Date: May 2, 2019

(65) Prior Publication Data
US 2020/0362065 A1 Nov. 19, 2020

(30) Foreign Application Priority Data
Oct. 24, 2017 (EP) ..................................... 17197898

(51) Int. Cl.
*C08F 10/06* (2006.01)
(52) U.S. Cl.
CPC ..................................... *C08F 10/06* (2013.01)
(58) Field of Classification Search
CPC ........ C08F 110/06; C08F 10/06; C08F 4/651; C08F 4/6546; C08F 2500/12
USPC ...................................................... 526/125.1
See application file for complete search history.

(56) References Cited

U.S. PATENT DOCUMENTS

| 8,901,261 | B2 * | 12/2014 | Haikarainen | ......... | C08F 4/6494 |
| | | | | | 526/124.2 |
| 9,115,223 | B2 * | 8/2015 | Denifl | ........................ | C08F 4/50 |
| 10,184,016 | B2 * | 1/2019 | Jayaratne | ................ | C08F 10/02 |
| 2012/0277090 | A1 * | 11/2012 | Spencer | .................. | C08F 10/00 |
| | | | | | 502/107 |
| 2013/0116393 | A1 | 5/2013 | Haikarainen et al. | | |
| 2015/0322177 | A1 * | 11/2015 | Jayaratne | ................ | C08F 10/02 |
| | | | | | 526/124.9 |

FOREIGN PATENT DOCUMENTS

| CN | 107810205 A | 3/2018 |
| EP | 376936 A2 | 7/1990 |
| EP | 428054 A1 | 5/1991 |
| EP | 591224 A1 | 4/1994 |
| EP | 688794 A1 | 12/1995 |
| EP | 810235 A2 | 12/1997 |
| EP | 2746300 A1 | 6/2014 |
| WO | 9212182 A1 | 7/1992 |
| WO | 9219653 A1 | 11/1992 |
| WO | 9618662 A1 | 6/1996 |
| WO | 9858975 A1 | 12/1998 |
| WO | 9951646 A1 | 10/1999 |
| WO | 0155230 A1 | 8/2001 |
| WO | 2003000754 A1 | 1/2003 |
| WO | 2003000757 A1 | 1/2003 |
| WO | 2004029112 A1 | 4/2004 |
| WO | 2005118655 A1 | 12/2005 |
| WO | 2006063771 A1 | 6/2006 |
| WO | 2007137849 A1 | 12/2007 |
| WO | 2007137853 A1 | 12/2007 |
| WO | 2012007430 A1 | 1/2012 |
| WO | 2013098137 A1 | 7/2013 |
| WO | 2013098138 A1 | 7/2013 |
| WO | 2013098149 A1 | 7/2013 |

OTHER PUBLICATIONS

International Search Report and Written Opinion for PCT/EP2018/079062 dated Feb. 13, 2019, 13 pages.
Office Action with English Translation for CN201880055927.1, dated Dec. 13, 2021, 19 pages.

* cited by examiner

*Primary Examiner* — Rip A Lee
(74) *Attorney, Agent, or Firm* — Lowenstein Sandler LLP

(57) ABSTRACT

The present invention relates to A Ziegler-Natta catalyst component in the form of solid particles having a median a particle size ($D50_{vol}$) of 5 to 200 μm and comprising i) a compound of Group 1 to 3, preferably of Group 2 metal, IUPAC, Nomenclature of Inorganic Chemistry, 1989 ii) a compound of a transition metal of Group 4 to 10, or of a lanthanide or actinide, preferably a transition metal of Group 4 to 6, IUPAC, Nomenclature of Inorganic Chemistry, 1989 and iii) an internal electron donor, wherein the solid particles a have a numerical SPAN of 0.80 or below and a ratio of numerical mode to volumetric mode ($Mode_{num}/Mode_{vol}$) of 0.60 or more and we Wherein $Mode_{num} < Mode_{vol}$. The invention also relates to a process for producing said catalyst component and use thereof producing $C_2$ to $C_{10}$ α-olefin polymers, especially propylene or ethylene polymers or copolymers thereof with α-olefins of 2 to 12 C-atoms.

20 Claims, No Drawings

CATALYSTS

CROSS-REFERENCE TO RELATED APPLICATION(S)

This application is a national phase of International Application No. PCT/EP2018/079062, filed on Oct. 23, 2018, which claims the benefit of European Patent Application No. 17197898.4, filed on Oct. 24, 2017. The contents of these applications are hereby incorporated by reference in their entirety.

FIELD OF THE INVENTION

This invention relates to a solid Ziegler-Natta catalyst component for producing olefin polymers and preparation thereof. Further, the invention relates to a Ziegler Natta catalyst comprising said solid catalyst component, Group 13 metal compound as cocatalyst and optionally an external electron donor. The invention further relates to the use of said catalyst component in producing $C_2$ to $C_{10}$ olefin polymers and (co)polymers thereof with other olefins of 2 to 12 C-atoms, especially ethylene and propylene polymers and copolymers thereof.

BACKGROUND OF THE INVENTION

Ziegler-Natta (ZN) type polyolefin catalysts are well known in the field of producing olefin polymers, like $C_2$ to $C_{10}$ olefin polymers and (co)polymers thereof with other α-olefins of 3 to 12 C-atoms. Generally the catalysts comprise at least a catalyst component formed from a transition metal compound of Group 4 to 10, or of lanthanide or actinide of the Periodic Table (IUPAC, Nomenclature of Inorganic Chemistry, 1989), a compound of a metal of Group 1 to 3 of the Periodic Table (IUPAC), and optionally, a compound of Group 13 of the Periodic Table (IUPAC), and optionally, an internal organic compound, like an internal electron donor. A ZN catalyst may also comprise further catalyst component(s), such as a cocatalyst and optionally an external electron donor.

A great variety of Ziegler-Natta catalysts have been developed to fulfill the different demands in reaction characteristics and for producing poly(alpha-olefin) resins of desired physical and mechanical performance. Typical Ziegler-Natta catalysts contain a magnesium compound, a titanium compound and optionally an aluminium compound supported on a particulate support. The commonly used particulate supports are Mg dihalide, preferably $MgCl_2$ based supports, or inorganic oxide type supports, such as silica, alumina, titania, silica-alumina or silica-titania, typically silica.

Typical Ziegler-Natta catalysts based on $MgCl_2$ contain a titanium compound and optionally a Group 13 compound, for example, an aluminium compound. Such catalysts are disclosed, for instance, in EP376936, EP591224, WO 2005/118655 and EP 810235 disclosing also spray-drying or spray-crystallisation methods for producing $MgCl_2$-based support materials.

The catalyst component can be prepared by sequentially contacting the inorganic support with the above mentioned compounds, for example, as described in EP 688794 and WO 99/51646.

Alternatively, it can be prepared by first preparing a solution from the components and then contacting the solution with a support, as described in WO 01/55230.

Still another way to produce solid ZN catalyst components is based on a method, where catalyst component ingredients are reacted in solution and the solid catalyst component is obtained by solidification or precipitation method. Such preparation method is described e.g. in patent publications WO2003/000757, WO2003/000754, WO2004/029112 WO2007/137849, WO2007/137853, WO2012/007430, WO2013/098149, WO2013/098137 and WO2013098138.

The above described ZN-catalysts are claimed to be useful in olefin polymerisation, for example for producing polymers of α-olefins of 2 to 6 C-atoms, especially of ethylene, propylene, 1-butene or (co)polymers thereof with ethylene and/or other α-olefins of 3 to 12 C-atoms.

However, even though many catalysts of prior art show satisfactory properties for many applications there has been the need to modify and improve the properties of the catalysts to achieve desired performance in desired polymerisation processes and to get desired polymer properties.

Catalyst particle size and particle size distribution are of importance in polymerisation process and at least a reasonable uniform particle size distribution is generally desired. Particle morphology of supported catalysts is highly dependent on the morphology of the support material. Solid catalyst components or catalyst support materials may be classified as re the particle size and particle size distribution by using conventional classifying techniques, e.g. screening techniques. Although much development work in Ziegler-Natta catalyst preparation has been done, there is still room for improvement especially relating to the features of particle size and particle size distribution. Classification of the particles as re catalyst particle size is typically needed to obtain a catalyst in the form of solid particles having desired uniform particle size, i.e. desired narrow particle size distribution. However, any classification step means an extra step in catalyst preparation. One commonly used method for screening the particles is sieving. Fines may also be removed e.g. together with a liquid (e.g. wash liquids). However, it is not only the removal of the non-desired catalyst particles, which causes extra work and costs. In addition, removing part of the catalyst particles from the produced material decreases the total yield of the produced catalyst. The removed catalyst part, i.e. the non-desired particles, forms waste material, which is to be handled according to the strict environmental requirements and rules. If the catalyst fines are not removed, it will easily result in problems in later use, e.g. plugging in reactors, pumps and process lines. Thus, even though catalyst components in the form of solid particulate material having a reasonable narrow particle size distribution (PSD) are disclosed in patent literature, there is still room for providing catalyst having still narrower PSD. Especially it would be highly appreciated to provide particulate catalyst with a decreased amount of very small particles without the need of using any screening step after catalyst formation for removing the non-desired catalyst part, especially the very small catalyst particles. Further, it is to be noted that when the removal step is not needed the catalyst yield in catalyst production will be higher.

Due to the replica effect polymer particles will follow the morphology of the catalyst particles, i.e. catalyst with narrow particle size distribution should result in polymer having similar narrow particle size distribution, however the resulting polymer will naturally be of bigger particle size. Decreasing formation of fines during polymerisation is highly desired, because fines cause several problems in the process and in the final polymer. Formation of fines may cause severe problems especially in process configurations comprising one or more gas phase reactors. Such process may be one-stage process or a multistage process comprising at least one gas phase reactor and optionally at least one slurry polymerisation reactor. Thus, preventing formation of fines in continuous full-scale polymerisation is of utmost important in order to prevent reactor fouling and to run polymerisation processes smoothly and without any non-planned process shutdown. This phenomenon will not be seen in small lab or bench scale batch processes, but is a real issue in continuous big scale polymerisation processes, especially in process configurations comprising at least one gas phase reactor.

Using catalyst with more uniform particle size, i.e. with a narrow particle size distribution and having a decreased amount of very small particles in the solid catalytic material, formation of fines in polymerisation process can be effectively decreased or totally avoided. Thus, the problems, like plugging, caused by catalyst fines can be avoided or at least essentially decreased. Further, due to the replica effect the narrow particle size distribution of the catalyst will lead to a narrow particle size distribution of the polymer. As a further benefit, polymers with a narrow particle size distribution are easier to handle in post reactor processes.

SUMMARY OF THE INVENTION

It has now been surprisingly found that many problems in a polymerisation process originating from non-satisfactory catalyst particle size and particle size distribution can be solved, when a solid Ziegler-Natta catalyst having numerical SPAN of 0.80 or less and a ratio of numerical mode to volumetric mode ($Mode_{num}/Mode_{vol}$) of 0.60 or more is used in the polymerisation process. Further, it has now also been found that such catalyst particles are obtainable directly from the catalyst manufacturing process without a need of using any catalyst classification methods as re catalyst particle size for removing the non-desired catalyst particles, especially too small catalyst particles, like catalyst fines.

Thus, the object of the present invention is to provide a Ziegler-Natta catalyst component in the form of solid particles having a median particle size ($D50_{vol}$) of 5 to 200 μm and comprising i) a compound of Group 1 to 3, preferably of Group 2 metal, IUPAC, Nomenclature of Inorganic Chemistry, 1989 ii) a compound of a transition metal of Group 4 to 10, or of a lanthanide or actinide, preferably a transition metal of Group 4 to 6, IUPAC, Nomenclature of Inorganic Chemistry, 1989 and iii) an internal electron donor, wherein the solid particles have a numerical SPAN of 10.80 or below and a ratio of numerical mode to volumetric mode ($Mode_{num}/Mode_{vol}$) of 0.60 or more.

Further, the object of the present invention is to provide a process for producing olefin polymer in the presence of the Ziegler-Natta catalyst component in the form of solid particles having a median particle size ($D50_{vol}$) of 5 to 200 μm and comprising i) a compound of Group 1 to 3, preferably of Group 2 metal, IUPAC, Nomenclature of Inorganic Chemistry, 1989 ii) a compound of a transition metal of Group 4 to 10, or of a lanthanide or actinide, preferably a transition metal of Group 4 to 6, IUPAC, Nomenclature of Inorganic Chemistry, 1989 and iii) an internal electron donor, wherein the solid particles have a numerical SPAN of 0.80 or below and a ratio of numerical mode to volumetric mode ($Mode_{num}/Mode_{vol}$) 0.60 or more.

Further, the object of the present invention is to provide a method for producing the Ziegler-Natta catalyst component as defined above.

Further, the object of the present invention is the use of the Ziegler-Natta catalyst component as defined above for producing of $C_2$ to $C_{10}$ olefin polymers and copolymers thereof with $C_2$ to $C_{12}$ olefin monomers.

In addition, the invention relates to a catalyst comprising the Ziegler-Natta catalyst component as defined above, a cocatalyst and optionally an external additive, like an external electron donor, and use of said catalyst in olefin polymerisation process.

In the present disclosure, the term internal electron donor denotes a compound being part of the solid catalyst component, i.e. added during the synthesis thereof. The external electron donor denotes a component being not part of the solid catalyst component, but fed as a separate component to the polymerisation process.

DETAILED DESCRIPTION OF THE INVENTION

In the present application the following indicators for catalyst particle size and particle size distribution are used:

Particle Size Distribution (PSD):

Typical way to define PSD is to give the SPAN as a relative distribution based on volumetric amount of particles, i.e. as volumetric SPAN ($SPAN_{vol}$).

$$SPAN_{vol} = (D90_{vol} - D10_{vol})/D50_{vol}$$

where $D90_{vol}$=the volumetric amount of particle diameter at 90% cumulative size, i.e. 90% by volume of the particles are smaller than this diameter $D10_{vol}$=the volumetric amount of particle diameter at 10% cumulative size, i.e. 10% by volume of the particles are smaller than this diameter $D50_{vol}$=the volumetric amount of particle diameter at 50% cumulative size. I.e. 50% by volume of the particles are smaller than this diameter and 50% are larger. $D50_{vol}$ is the volumetric median particle size of the particles.

$SPAN_{vol}$, $D90_{vol}$, $D10_{vol}$ and $D50_{vol}$ are often disclosed in the field without a subscript "vol", i.e. as SPAN, D90, D10 and D50, respectively.

Another way to define the PSD is based on numerical SPAN ($SPAN_{num}$).

Numerical SPAN is defined as follows:

$$SPAN_{num} = (D90_{num} - D10_{num})/D50_{num}$$

where $D90_{num}$=the numerical amount of particles at 90% cumulative size. I.e. 90% by numerical amount of the particles are smaller than this diameter $D10_{num}$=the numerical amount of particles at 10% cumulative size. I.e. 10% by numerical amount of the particles are smaller than this diameter $D50_{num}$=the numerical amount of particles at 50% cumulative size. I.e. 50% by numerical amount of the particles are smaller than this diameter and 50% are larger.

Median particle size, D50, as defined above denotes the particle size, where half of the particles reside above the given value and half below said value, thus $D50_{vol}$ is the median particle size of volumetric distribution and $D50_{num}$ is the median particle size of numerical distribution.

In this application, if no subscript $_{vol}$ is marked in SPAN, D10, D50 and D90, they mean volumetric values, whereas numerical SPAN, D10, D50 and D90 are marked with subscript "$_{num}$", respectively.

Volumetric and numerical SPAN values give different information of the particle size distribution. By definition, volumetric SPAN is based on the volumetric amount of particles and numerical SPAN is based on the numerical amounts of particles.

Mode:

The mode represents the particle size (or size range) most commonly found in the particle size distribution, i.e. corresponds to the highest peak in the differential distribution. Mode is defined in the present application by volumetric mode ($Mode_{vol}$) and numerical mode ($Mode_{num}$). Mode may also be called as modal diameter.

Particle size measurements may be done using instruments based on different methods. Measurements may be based among others on determination of sizes for individual particles, i.e. using single particle counters. Some instruments determine volume vs size. The differential number-weighted distribution may be converted to a differential volume-weighted distribution by multiplying the number by diameter cubed. However, converting measurement results of volume-weighted particle size distribution to number-weighted distribution is not recommended due to several undefined error factors. Thus, such converted results are not reliable. The differential distribution shows the relative amount (e.g. by number or volume) at each size. In the present application measurements are based on methods using single particle counters.

Volumetric distribution is always shifted towards larger particle sizes than the numerical distribution; and the mode of the volume distribution is higher than the mode in the number distribution of the same material. In counting experiments even a few relative big particles dominate the volume distribution shifting the $Mode_{vol}$ to a bigger particle size, whereas the numerical mode ($Mode_{num}$) is more sensitive to small particles shifting the numerical distribution to the smaller particles.

Further, weighting of small particles is of less weight in volumetric SPAN, compared to the numerical SPAN, which takes equally into account all particles, i.e. the numerical amounts of particles. Thus, in the same material $D50_{num}$ may be, and typically is, of a lower value than $D50_{vol}$. Combination of the small $SPAN_{vol}$ and small $SPAN_{num}$ indicates that the particulate material has a narrow particle size distribution.

Thus, a smaller $Mode_{num}$ value indicates that the amount of small particles is higher; and vice a versa, a higher $Mode_{num}$ value indicates that the amount of small particles is lower. Thus, if smaller particles are not desired, the numerical Mode should have a higher value. In an ideal situation the numerical mode approaches the volumetric mode, but the value is always smaller than that of the volumetric mode value.

Thus, relative position of the volume and numerical mode distribution peaks, i.e. the ratio $Mode_{num}/Mode_{vol}$ further indicates the presence of fines in the particulate material. Thus, a higher $Mode_{num}/Mode_{vol}$ ratio indicates that there is less fines compared to the material having a smaller $Mode_{num}/Mode_{vol}$ ratio.

Thus, numerical values $D90_{num}$, $D10_{num}$, $D50_{num}$, $SPAN_{num}$ and $Mode_{num}$ give additional important information of the particle size and particle size distribution of the particulate material. Different particulate materials having volumetric SPAN on the same level may still have clear differences in numerical SPAN ($SPAN_{num}$). The lower the $SPAN_{num}$, the less small particles are present in the particulate material.

Catalyst Components

As indicated above, the object of the present invention is to provide a Ziegler-Natta catalyst component in the form of solid particles having a median particle size ($D50_{vol}$) of 5 to 200 µm comprising
  i) a compound of Group 1 to 3, preferably of Group 2 metal, IUPAC, Nomenclature of Inorganic Chemistry, 1989
  ii) a compound of a transition metal of Group 4 to 10, or of a lanthanide or actinide, preferably a transition metal of Group 4 to 6, IUPAC, Nomenclature of Inorganic Chemistry, 1989 and
  iii) an internal electron donor,
wherein the solid particles have a numerical SPAN ($SPAN_{num}$) of 0.80 or below and a ratio of numerical mode to volumetric mode ($Mode_{num}/Mode_{vol}$) of 0.60 or more, and wherein $Mode_{num}<Mode_{vol}$.

Thus, $0.60 \leq Mode_{num}/Mode_{vol}$ is $<1.0$.

The solid particles as defined above are obtained from the catalyst component preparation process without any need to remove the non-desired catalyst particles. Thus, the final catalyst component in the form of solid particles according to the invention is obtained without using any screening step.

Preferably, $SPAN_{num}$ is 0.70 or below, more preferably 0.60 or below, even 0.50 or below. Thus, in an especially preferred embodiment $SPAN_{num}$ is at most 0.50.

Particles of the catalyst component of the present invention have median particle size $D50_{vol}$ preferably in the range of 8 to 200 µm, more preferably in the range of 10 to 150 µm. In some embodiments the $D50_{vol}$ is preferably in the range of 20 to 100 µm.

The catalyst component in the form of solid particles has the ratio $Mode_{num}/Mode_{vol} \geq 0.60$, preferably $\geq 0.70$, more preferably 0.80 or more, even 0.85 or more, but less than 1.

The combination of narrow numerical SPAN ($SPAN_{num}$) of 0.8 or below and the ratio $Mode_{num}/Mode_{vol} \geq 0.60$ gives a strong indication that the catalyst component has a narrow particle size distribution and the amount of fines is very small.

Particles of the catalyst component of the present invention have numerical median particle size $D50_{num}$ in in the range of 5 to <200 µm, more preferably in the range of 8 to <150 µm. In some embodiments the $D50_{num}$ is preferably in the range of 10 to <100 µm.

In a preferred embodiment, in addition to the defined $SPAN_{num}$, the volumetric SPAN ($SPAN_{vol}$) of the catalyst component of the present invention is 1.10 or below. Preferably the $SPAN_{vol}$ is 1.0 or below.

Further, the catalyst particles have preferably a surface area of less than 20 $m^2/g$, more preferably of less than 10 $m^2/g$.

The compound the Group 2 metal is preferably a magnesium compound.

The transition metal compound of Group 4 to 10, or of a lanthanide or actinide is preferably a compound of Group 4 to 6, more preferably a Group 4 transition metal compound or a vanadium compound and is still more preferably a titanium compound. Particularly preferably the titanium compound is a halogen-containing titanium compound of the formula $X_y Ti(OR^8)_{4-y}$, wherein $R^8$ is a $C_{1-20}$ alkyl, preferably a $C_{2-10}$ and more preferably a $C_{2-8}$ alkyl group, X is halogen, preferably chlorine and y is 1, 2, 3 or 4, preferably 3 or 4 and more preferably 4.

Suitable titanium compounds include trialkoxy titanium monochloride, dialkoxy titanium dichloride, alkoxy titanium trichloride and titanium tetrachloride, and is most preferably titanium tetrachloride.

The internal electron donors in the catalyst component of the invention are suitable among others, (di)esters of carboxylic (di)acids, like phthalates or (di)esters of non-phthalic carboxylic (di)acids, ethers, diethers or oxygen or nitrogen containing silicon compounds, or mixtures thereof. In the present application terms internal donor, internal electron donor and donor have the same meaning.

The internal donor used is preferably selected from (di) esters of non-phthalic carboxylic (di)acids, 1,3-diethers, derivatives and mixtures thereof. More preferably the internal electron donors are (di)esters of non-phthalic (di)carboxylic acids, in particular esters belonging to a group comprising substituted or non-substituted malonates, maleates, succinates, substituted maleates, like citraconates, glutarates, cyclohexene-1,2-dicarboxylates and benzoates, and any derivatives and/or mixtures thereof. Especially preferred examples are e.g. substituted maleates, more preferably citraconates, especially di-2-ethylhexyl citraconate.

Typically the amount of Ti is in the range of 1-6 wt-%, the amount of Mg is in the range of 10 to 20 wt-% and the amount of the internal donor is in the range of 10 to 40 wt-% in the catalyst component.

The Ziegler-Natta catalyst component may optionally contain an aluminium alkyl compound of the formula $AlR_{3-m-n}R'_mX_n$, where R is an alkyl and R' is an alkoxy group of 1 to 20, preferably of 1 to 10 carbon atoms, X is a halogen, preferably chloride, and m is 0, 1 or 2 and n is 0, 1 or 2, provided that the sum of m+n is at most 2.

The catalyst of the invention comprises, in addition to the solid catalyst component as defined above, a cocatalyst, which is also known as an activator and optionally an external electron donor.

Cocatalysts are preferably organometallic compounds of Group 13 metal, typically aluminium compounds. These compounds include aluminium alkyls and alkyl aluminium halides. Preferably, the alkyl group is a C1-C8 alkyl group, preferably C1-C4 alkyl group, and the halide is a chloride. Preferably the co-catalyst (Co) is a tri (C1-C4) alkylaluminium, di(C1-C4)alkyl aluminium chloride or (C1-C4) alkyl aluminium dichloride or mixtures thereof. Most preferably, the alkyl group is ethyl. In one specific embodiment, the co-catalyst (Co) is triethylaluminium (TEAL).

External electron donors are typically used in propylene polymerization, however also known to have been used in ethylene polymerisation. In the present application terms external electron donor and external donor have the same meaning.

Suitable external electron donors (ED) include certain silanes, ethers, esters, amines, ketones, heterocyclic compounds and blends thereof. It is especially preferred to use silanes selected from silanes of the general formula (A)

(A)

wherein $R^a$, $R^b$ and $R^c$ are independently same or different a linear, branched or cyclic hydrocarbon group having 1 to 12 carbon atom, in particular an alkyl or cycloalkyl group, and wherein p and q are numbers ranging from 0 to 3 with their sum p+q being equal to or less than 3; or silanes of general formula (B)

(B)

wherein $R^3$ and $R^4$ can be the same or different and represent a linear, branched or cyclic hydrocarbon group having 1 to 12 carbon atoms. Preferably, $R^3$ and $R^4$ are independently selected from the group consisting of methyl, ethyl, n-propyl, n-butyl, octyl, decanyl, iso-propyl, iso-butyl, iso-pentyl, tert.-butyl, tert.-amyl, neopentyl, cyclopentyl, cyclohexyl, methylcyclopentyl and cycloheptyl, and are more preferably ethyl.

Most preferably external donors are selected form silanes of formula (A) and especially selected from (tert-butyl)$_2$Si(OCH$_3$)$_2$, (cyclohexyl)(methyl)Si(OCH$_3$)$_2$, (cyclopentyl)$_2$Si(OCH$_3$)$_2$ and (phenyl)$_2$Si(OCH$_3$)$_2$.

The catalyst of the present invention is used for polymerising $C_2$ to $C_{10}$ olefin, preferably $C_2$ to $C_6$ olefin, optionally with one or more comonomers. Most commonly produced olefin polymers are polyethylene, polypropylene and copolymers thereof. The catalyst of the present invention is especially suitable for producing polypropylene and copolymers thereof. Commonly used comonomers are alpha-olefin comonomers preferably selected from $C_2$-$C_{20}$-alpha-olefins, more preferably are selected from $C_2$-$C_{12}$-alpha-olefins, such as ethylene, 1-butene, isobutene, 1-pentene, 1-hexene, 4-methyl-1-pentene, 1-heptene, 1-octene, 1-nonene and 1-decene, as well as dienes, such as butadiene, 1,7-octadiene and 1,4-hexadiene, or cyclic olefins, such as norbornene, and any mixtures thereof. Most preferably, the comonomer is ethylene, 1-butene and/or 1-hexene.

Catalyst Preparation

The catalyst component in the form of solid particles of the present invention may be prepared by any method, which results in said catalyst component having the properties as defined above. Thus, the resulted catalyst component shall have a median particle size (D50$_{vol}$) in the range of 5 to 200 μm, a numerical SPAN (SPAN$_{num}$) of 0.80 or below and a ratio of a numerical mode to a volumetric mode (Mode$_{num}$/Mode$_{vol}$) of 0.60 or more and Mode$_{num}$<Mode$_{vol}$.

In addition, said catalyst component is obtainable, preferably obtained, directly after the recovery of the catalyst component from the preparation process without a step to remove the non-desired catalyst particles. Thus, no extra particle removal step, i.e. a screening step, is needed in order to achieve the catalyst component as defined above.

Thus, according to a preferred embodiment of the present invention, a Ziegler-Natta catalyst component in the form of solid particles having a median particle size (D50$_{vol}$) from 5 to 200 μm is prepared by a process comprising steps:

a) providing a solution of at least one Group 2 metal alkoxide, preferably at least one magnesium alkoxide,
b) providing a solution of at least one compound of a transition metal of Group 4 to 10, or of a lanthanide or actinide, preferably of transition metal of Group 4 to 6,
c) adding the solution from step a) to the solution of step b) and
d) recovering the solid catalyst component particles, wherein an internal electron donor or precursor thereof is added at any step prior to the recovery step d), provided that at least part of the whole amount of the internal electron donor or precursor thereof is added in step b), during step c) or after completing step c), and wherein the catalyst component in the form of solid particles has a numerical SPAN of 0.80 or below and has a ratio of a numerical mode to a volumetric mode (Mode$_{num}$/Mode$_{vol}$) of 0.60 or more and wherein Mode$_{num}$<Mode$_{vol}$.

In addition, the catalyst component is obtained directly after the recovery step without any need to screen non-desired catalyst particles out of the catalyst component.

Thus, the internal electron donor (ID) or precursor thereof is added to the solution of at least one Group 2 metal alkoxide, (step a)), to the solution of at least one compound of the transition metal of Group 4 to 6, (step b)), during step c) or after completing step c), but before step d), provided that the whole amount of the internal donor is not added to the solution of at least one Group 2 metal alkoxide (step a)).

According to one embodiment, addition of the donor may be split between the steps a) to c) (including completing step c)). In one preferred embodiment the first part of the internal donor is added to the solution of step a) and a second part is added to the solution of step b) or during step c) or after completing step c). The donor may be added as such or as a solution with a hydrocarbon solvent.

The ratio (wt-%) (the first part of the donor):(the second part of the donor) is 5 to 95:95 to 5, preferably 10 to 90:90:10, more preferably 20 to 80:80 to 20. Still more preferably the % ratio is 10 to 50:90 to 50, especially 20 to 40:80 to 60, like 20 to 30:80 to 70, like 25:75.

The catalyst component in the form of solid particles having $D50_{vol}$ of 5 to 200 μm a numerical SPAN of 0.80 or below and a ratio of the numerical mode to the volumetric mode ($Mode_{num}/Mode_{vol}$) of 0.60 or more, is obtainable, preferably obtained without any screening step.

According to the procedure above the solid catalyst may be obtained via precipitation method or via emulsion-solidification method depending on the physical conditions, especially on temperature used in steps c) and d). Emulsion is also called a liquid/liquid two-phase system.

In both methods (precipitation or emulsion-solidification) the catalyst chemistry is the same.

In the precipitation method combination (step c) of the solution of step a) with the at least one transition metal compound of step b) is carried out and the whole reaction mixture is kept at least at 50° C., more preferably in the temperature range of 55 to 110° C., more preferably in the range of 70 to 100° C., to secure full precipitation of the catalyst component in form of a solid particles (step d).

In the emulsion-solidification method the solution of step a) is added to the at least one transition metal compound of step b) at a lower temperature, such as from −10 to below 50° C., preferably at a temperature in the range of −5 to 30° C. in step c). During agitation of the emulsion the temperature is typically kept at −10 to below 40° C., preferably from −5 to 30° C. Droplets of the dispersed phase of the emulsion form the active catalyst composition. Solidification (step d) of the droplets is suitably carried out by heating the emulsion to a temperature of 70 to 150° C., preferably to 80 to 110° C.

In the emulsion-solidification method, the dispersed phase in the form of liquid droplets of the emulsion forms the catalyst part, which is transformed to solid catalyst particles during the solidification step.

The catalyst prepared by emulsion-solidification method is preferably used in the present invention.

In the emulsion-solidification method, the formation of the two phase liquid-liquid system (emulsion) may be facilitated by adding (further) solvent(s) and additives, such as surfactants. Surfactants act as emulsifying agents, which are used in a manner known in the art for facilitating the formation of and/or stabilizing the emulsion. Preferably, surfactants used in the present invention are acrylic or methacrylic polymers. Particular preferred surfactants are unbranched $C_{12}$ to $C_{20}$ (meth)acrylates such as poly(hexadecyl)-methacrylate and poly(octadecyl)-methacrylate and mixtures thereof. Surfactants may added at any step before step d), i.e. in step a), b) or c). In one preferred embodiment the surfactant is added to the solution of step a). Alternatively the surfactant is added or during or after adding the solution of step a) to the solution of step b). According to another preferred embodiment the surfactant is added, in case of a split donor addition, before the second part of donor is fed to the reactor.

Surfactants may also be used in preparing a catalyst component by the above precipitation method.

The solid particulate product produced by precipitation or emulsion-solidification method may be washed at least once, preferably at least three times, most preferably at least five times with aromatic and/or aliphatic hydrocarbons, preferably with toluene, heptane or pentane and/or with $TiCl_4$. Said washing solutions may also contain internal donor(s) and/or compound(s) of Group 13, like trialkyl aluminum, halogenated alkyl aluminum compounds or alkoxy aluminum compounds. The aluminum compounds may also be added during the catalyst synthesis in steps a) to d). The catalyst can further be dried, e.g. by evaporation or flushing with nitrogen before the final recovery in step d). If desired, catalyst component may be slurried to an oily liquid without any drying step.

The finally obtained Ziegler-Natta catalyst component of the invention is desirably in the form of spherical particles having volumetric median particle size ($D50_{vol}$) of 5 to 200 μm and having narrow particle size distribution featured by numerical SPAN ($SPAN_{num}$) of 0.80 or below, and by the ratio of numerical mode to volumetric mode ($Mode_{num}/Mode_{vol}$) of 0.60 or more.

The catalyst particles prepared by the method as described above have preferably a surface area of less than 20 m$^2$/g, more preferably of less than 10 m$^2$/g.

Typically the amount of Ti is 1-6 wt-%, amount of Mg is 10 to 20 wt-% and amount of internal donor is 10 to 40 wt-% in the catalyst component.

In a more preferred embodiment the solid catalyst component of the invention in the form of solid particles having volumetric median particle size ($D50_{vol}$) of 5 to 200 μm, $SPAN_{num}$ of 0.80 or below, and a ratio of numerical mode to volumetric mode ($Mode_{num}/Mode_{vol}$) of 0.60 or more, is obtainable, more preferably obtained, by the following procedure:

a) providing a solution of
  $a_1$) at least a Group 2 metal alkoxy compound (Ax) being the reaction product of a Group 2 metal compound and an alcohol (A) comprising in addition to the hydroxyl moiety at least one ether moiety optionally in an organic liquid reaction medium; or
  $a_2$) at least a Group 2 metal alkoxy compound (Ax') being the reaction product of a Group 2 metal compound and an alcohol mixture of the alcohol (A) and a monohydric alcohol (B) of formula ROH, optionally in an organic liquid reaction medium; or
  $a_3$) a mixture of the Group 2 metal alkoxy compound (Ax) and a Group 2 metal alkoxy compound (Bx) being the reaction product of a Group 2 metal compound and the monohydric alcohol (B), optionally in an organic liquid reaction medium; or
  $a_4$) Group 2 metal alkoxy compound of formula $M(OR_1)_n(OR_2)_m X_{2-n-m}$ or mixture of Group 2 alkoxides $M(OR_1)_n X_{2-n'}$ and $M(OR_2)_m X_{2-m'}$, where M is Group 2 metal, X is halogen, $R_1$ and $R_2$ are different alkyl groups of $C_2$ to $C_{16}$ carbon atoms, and 0≤n<2, 0≤m<2 and n+m≤2, provided that both n and m are not simultaneously zero, 0<n'≤2 and 0<m'≤2; and
b) providing a solution of at least one compound of a transition metal of Group 4 to 6, preferably $TiCl_4$, c) adding the solution from step a) to the solution of step b) and d) recovering the solid catalyst component particles, wherein an internal electron donor or precursor thereof is added at any step prior to the recovery step d), provided that at least part of the whole amount of the internal electron donor or precursor thereof is added in step b), during step c) or after completing step c).

The internal electron donors used in the preparation of the catalyst component of the invention are suitable among others, (di)esters of carboxylic (di)acids, like phthalates or (di)esters of non-phthalic carboxylic (di)acids, ethers, diethers or oxygen or nitrogen containing silicon compounds, or precursors or mixtures thereof.

The internal donor used is preferably selected from (di) esters of non-phthalic carboxylic (di)acids, 1,3-diethers, derivatives and mixtures thereof. More preferred donors are (di)esters of non-phthalic (di)carboxylic acids, in particular esters belonging to a group comprising substituted or non-substituted malonates, maleates, succinates, substituted maleates, like citraconates, glutarates, cyclohexene-1,2-dicarboxylates and benzoates, and any derivatives and/or mixtures thereof. Especially preferred examples are e.g. substituted maleates, preferably citraconates, especially di-2-ethylhexyl citraconate. According to the preferred embodiment no phthalic compounds are used in the preparation of the solid catalyst component of the invention.

Group 2 metal is preferably magnesium.

The magnesium alkoxy compounds (Ax), (Ax') and (Bx) can be prepared in situ in the first step of the catalyst preparation process, step a), by reacting the magnesium compound with the alcohol(s) as described above, or said magnesium alkoxy compounds can be separately prepared magnesium alkoxy compounds or they can be even commercially available as ready magnesium alkoxy compounds ($a_4$)) and used as such in the catalyst preparation process of the invention.

In a preferred embodiment in step a) the solution of $a_2$) or $a_3$) are used, i.e. a solution of (Ax') or a solution of a mixture of (Ax) and (Bx).

Illustrative examples of alcohols (A) are glycol monoethers. Preferred alcohols (A) are $C_2$ to $C_4$ glycol monoethers, wherein the ether moieties comprise from 2 to 18 carbon atoms, preferably from 4 to 12 carbon atoms. Preferred examples are 2-(2-ethylhexyloxy)ethanol, 2-butyloxy ethanol, 2-hexyloxy ethanol and 1,3-propylene-glycol-monobutyl ether, 3-butoxy-2-propanol, with 2-(2-ethylhexyloxy)ethanol and 1,3-propylene-glycol-monobutyl ether, 3-butoxy-2-propanol being particularly preferred. Illustrative monohydric alcohols (B) are of formula ROH, with R being straight-chain or branched $C_2$-$C_{16}$ alkyl residue, preferably $C_4$ to $C_{10}$, more preferably $C_6$ to $C_8$ alkyl residue. The most preferred monohydric alcohol is 2-ethyl-1-hexanol or octanol.

Preferably a mixture of Mg alkoxy compounds (Ax) and (Bx) or mixture of alcohols (A) and (B), respectively, are used and employed in a mole ratio of Bx:Ax or B:A from 10:1 to 1:10, more preferably 6:1 to 1:6, still more preferably 5:1 to 1:3, most preferably 5:1 to 3:1.

Magnesium alkoxy compound may be a reaction product of alcohol(s), as defined above, and a magnesium compound selected from dialkyl magnesiums, alkyl magnesium alkoxides, magnesium dialkoxides, alkoxy magnesium halides and alkyl magnesium halides. Further, magnesium dialkoxides, magnesium diaryloxides, magnesium aryloxyhalides, magnesium aryloxides and magnesium alkyl aryloxides can be used. Alkyl groups can be similar or different $C_1$-$C_{20}$ alkyls, preferably $C_2$-$C_{10}$ alkyl. Typical alkyl-alkoxy magnesium compounds, when used, are ethyl magnesium butoxide, butyl magnesium pentoxide, octyl magnesium butoxide and octyl magnesium octoxide. Preferably the dialkyl magnesiums are used. Most preferred dialkyl magnesiums are butyl octyl magnesium or butyl ethyl magnesium.

It is also possible that magnesium compound can react in addition to the alcohol (A) and alcohol (B) also with a polyhydric alcohol (C) of formula $R''(OH)_m$ to obtain said magnesium alkoxide compounds. Preferred polyhydric alcohols, if used, are alcohols, wherein R'' is a straight-chain, cyclic or branched $C_2$ to $C_{10}$ hydrocarbon residue, and m is an integer of 2 to 6.

The magnesium alkoxy compounds of step a) are thus selected from the group consisting of magnesium dialkoxides, diaryloxy magnesiums, alkyloxy magnesium halides, aryloxy magnesium halides, alkyl magnesium alkoxides, aryl magnesium alkoxides and alkyl magnesium aryloxides. In addition a mixture of magnesium dihalide and a magnesium dialkoxide can be used.

The solvents to be employed for the preparation of the present catalyst may be selected among aromatic and aliphatic straight chain, branched and cyclic hydrocarbons with 5 to 20 carbon atoms, more preferably 5 to 12 carbon atoms, or mixtures thereof. Suitable solvents include benzene, toluene, cumene, xylol, pentane, hexane, heptane, octane and nonane. Heptane and pentane are particular preferred.

The reaction for the preparation of the magnesium alkoxy compound may be carried out at a temperature of 0° to 80° C., preferably at a temperature of 20° to 70° C. Most suitable temperature is selected depending on the Mg compound and alcohol(s) used.

The transition metal compound is preferably a compound of Group 4 to 6 metal, more preferably a titanium compound, and most preferably a titanium halide, especially $TiCl_4$.

PREFERRED EMBODIMENTS

The invention is described in the following in more detail, referring to the preferred embodiments. Preferred embodiments are described in dependent claims as well in the following description. As indicated above, the ratio $Mode_{num}/Mode_{vol}$ is ≥0.60, preferably ≥0.70, more preferably ≥0.80, still more preferably 0.85 or more, and wherein $Mode_{num}<Mode_{vol}$. Thus, the ratio $Mode_{num}/Mode_{vol}$ is in the range 0.60 to <1.0. Preferably the ratio $Mode_{num}/Mode_{vol}$ is in the range of 0.7 to <1.0, more preferably 0.80 to <1.0, still more preferably in the range of 0.85 to <1.0.

As indicated above, $SPAN_{num}$ is preferably 0.70 or below, more preferably 0.60 or below, even 0.50 or below. Thus, in an especially preferred embodiment $SPAN_{num}$ is even 0.5 or below.

As indicated the combination of narrow numerical SPAN ($SPAN_{num}$) and a high ratio of $Mode_{num}/Mode_{vol}$ gives a strong indication that the amount of fines is very small in the catalyst component.

In a preferred embodiment $SPAN_{num}$ is 0.70 or below and the ratio $Mode_{num}/Mode_{vol}$ is 0.70 or higher. In a more preferred embodiment $SPAN_{num}$ is 0.70 or below and the ratio $Mode_{num}/Mode_{vol}$ is 0.80 or higher, preferably 0.85 or higher. In a still more preferred embodiment $SPAN_{num}$ is 0.60 or below and the ratio $Mode_{num}/Mode_{vol}$ is 0.70 or higher, preferably 0.8 or higher and even 0.85 and higher. In an especially preferred embodiment $SPAN_{num}$ is 0.60 or below, more preferably below 0.50, and $Mode_{num}/Mode_{vol}$ is 0.80 or higher, even more preferably 0.85 or higher.

Particles of the catalyst component of the present invention have median particle size $D50_{vol}$ preferably in the range of 8 to 200 μm, more preferably in the range of 10 to 150 μm. In some embodiments the $D50_{vol}$ is preferably in the range of 20 to 100 μm.

Particles of the catalyst component of the present invention have numerical median particle size $D50_{num}$ in the range of 5 to <200 μm, preferably in the range of 8 to <150 μm. In some embodiments the $D50_{num}$ is preferably in the range of 10 to <100 μm.

Preferably the $D50_{vol}$ and $D50_{num}$, value ranges are close to each other. However, it is typical that $D50_{num}$ is lower than $D50_{vol}$. Thus, preferably $D50_{vol}$ is in the range of 8 to 200 μm and $D50_{num}$ is in the range of 5 to <200 μm, more preferably $D50_{vol}$ is in the range of 10 to 150 μm and $D50_{num}$ is in the range of 8 to <150 μm. It's especially preferred that $D50_{vol}$ is in the range of 20 to 100 μm, and $D50_{num}$ is in the range of 10 to <100 μm.

In a specially preferred embodiment $D50_{vol}$ is in the range of 8 to 200 μm, $SPAN_{num}$ is below 0.80 and the ratio $Mode_{num}/Mode_{vol}$ is 0.70 or higher. In addition $D50_{num}$ is in the range of 5 to <200 μm. According to one preferred embodiment $D50_{vol}$ is in the range of 8 to 200 μm, more preferably in the range of 10 to 150 μm and $SPAN_{num}$ is 0.70 or below, preferably 0.60 or below and the ratio $Mode_{num}/Mode_{vol}$ is 0.7 or higher, preferably 0.8 or higher.

According to still one preferred embodiment $D50_{vol}$ is in the range of 8 to 200 μm, more preferably in the range of 10 to 150 μm and $SPAN_{num}$ is 0.60 or below, more preferably below 0.50, and $Mode_{num}/Mode_{vol}$ is 0.8 or higher, more preferably 0.85 or higher.

In addition to the features of the solid catalyst particles as indicated above the volumetric $SPAN_{vol}$ is 1.1 or below. Preferably the $SPAN_{vol}$ is 1.0 or below.

The catalyst component of the invention has uniform particle size distribution and particles have preferably a low surface area being less than 20 m²/g, preferably being less than 10 m²/g. Further, in preferred embodiments the catalyst particles are featured by a uniform distribution of catalytically active sites thorough the catalyst particles.

In the inventive catalyst component the Group 2 metal is preferably magnesium.

The transition metal compound of Group 4 to 6 is more preferably a titanium compound, and most preferably is titanium tetrachloride.

The internal electron donor used is preferably selected from (di)esters of non-phthalic carboxylic (di)acids, 1,3-diethers, derivatives and mixtures thereof. Especially preferred internal electron donors are (di)esters of non-phthalic (di)carboxylic acids, in particular esters belonging to a group comprising substituted or non-substituted malonates, maleates, succinates, substituted maleates, like citraconates, glutarates, cyclohexene-1,2-dicarboxylates and benzoates, and any derivatives and/or mixtures thereof. More preferred examples of said donors are substituted maleates, most preferably citraconates, especially di-2-ethylhexyl citraconate.

According to a preferred embodiment the catalyst component of the present invention is in the form of solid spherical particles and is free of any external support material, like silica or any separately prepared $MgCl_2$ based support. More preferably the catalyst component is prepared by the process as described above. According to said preferred preparation method the at least one Group 2 metal alkoxide, preferably at least one magnesium alkoxide, the solution of at least one compound of a transition metal of Group 4 to 6, most preferably a $TiCl_4$ and the internal electron donor are contacted and reacted in solution, and after that the solid catalyst particles are formed either by precipitation or emulsion-solidification method. The final catalyst contains said internal electron donor as defined above, and Ti and Mg in amounts as indicated above. The preferred methods result in the catalyst component in the form of solid particles having features as indicated above. In addition the solid catalyst particles are featured by a uniform distribution of catalytically active sites thorough the catalyst particles.

The solid particles are obtained without any need to remove of the non-desired catalyst particles. Thus, the final Ziegler-Natta catalyst component in the form of solid particles with $D50_{vol}$, $SPAN_{num}$, and the ratio $Mode_{num}/Mode_{vol}$ values as defined above, is obtained without using any particle classification step, like screening, for removal of the non-desired catalyst particles.

Polymerisation

Catalyst of the present invention can be used in any commonly used uni- and multimodal processes for producing polyolefins. The polymerizations may be operated in slurry, solution, or gas phase reactors or combinations thereof. Typically ethylene and propylene (co)polymers are produced in commercial scale in a multimodal process configuration. Such multimodal polymerization processes known in the art comprise at least two polymerization stages. It is preferred to operate the polymerization stages in cascaded mode. Suitable processes comprising cascaded slurry and gas phase polymerization stages are disclosed, among others, in WO92/12182 and WO96/18662 and WO WO98/58975.

In a multimodal polymerisation configuration, the polymerisation stages comprise polymerisation reactors selected from slurry and gas phase reactors. In one preferred embodiment, the multimodal polymerisation configuration comprises at least one slurry reactor, followed by at least one gas phase reactor.

The catalyst may be transferred into the polymerization process by any means known in the art. It is thus possible to suspend the catalyst in a diluent and maintain it as homogeneous slurry. Especially preferred is to use oil having a viscosity from 20 to 1500 mPa·s as diluent, as disclosed in WO-A-2006/063771. It is also possible to mix the catalyst with a viscous mixture of grease and oil and feed the resultant paste into the polymerization zone. Further still, it is possible to let the catalyst settle and introduce portions of thus obtained catalyst mud into the polymerization zone in a manner disclosed, for instance, in EP-A-428054.

The polymerization in slurry may take place in an inert diluent, typically a hydrocarbon diluent such as methane, ethane, propane, n-butane, isobutane, pentanes, hexanes, heptanes, octanes etc., or their mixtures. Preferably, the diluent is a low-boiling hydrocarbon having from 1 to 4 carbon atoms, like propane or a mixture of such hydrocarbons. In propylene polymerisation the propylene monomer is usually used as the reaction medium.

The temperature in the slurry polymerization is typically from 40 to 115° C., preferably from 60 to 110° C. and in particular from 70 to 100° C., like from 70 to 90° C. The pressure is from 1 to 150 bar, preferably from 10 to 100 bar.

The slurry polymerization may be conducted in any known reactor used for slurry polymerization. Such reactors include a continuous stirred tank reactor and a loop reactor. It is especially preferred to conduct the polymerization in loop reactor. Hydrogen is fed, optionally, into the reactor to control the molecular weight of the polymer as known in the art. Furthermore, one or more alpha-olefin comonomers may be added into the reactor. The actual amount of such hydrogen and comonomer feeds depends on the desired melt index (or molecular weight), density or comonomer content of the resulting polymer.

The polymerization in gas phase may be conducted in a fluidized bed reactor, in a fast fluidized bed reactor or in a settled bed reactor or in any combination of these.

Typically the fluidized bed or settled bed polymerization reactor is operated at a temperature within the range of from 50 to 100° C., preferably from 65 to 90° C. The pressure is suitably from 10 to 40 bar, preferably from 15 to 30 bar.

Also antistatic agent(s) may be introduced into the slurry and/or gas phase reactor if needed. The process may further comprise pre- and post-reactors.

The actual polymerization steps may be preceded by a pre-polymerisation step. The pre-polymerisation step may be conducted in slurry or in gas phase. Preferably pre-polymerisation is conducted in slurry, and especially in a loop reactor. The temperature in the pre-polymerisation step is typically from 0 to 90° C., preferably from 20 to 80° C. and more preferably from 30 to 70° C.

The pressure is not critical and is typically from 1 to 150 bar, preferably from 10 to 100 bar.

The polymerisation may be carried out continuously or batch wise, preferably the polymerisation is carried out continuously in commercial scale polymerisation.

EXPERIMENTAL PART

Measurement Methods

Ti, Mg and Al Content—ICP-OES

The sample consisting of dry catalyst powder is mixed so that a representative test portion can be taken. Approximately 20-50 mg of sample is sampled in inert atmosphere into a 20 ml volume crimp cap vial and exact weight of powder recorded.

A test solution of known volume (V) is prepared to a volumetric flask. Sample digestion is performed in the cooled vial by adding a small amount of freshly distilled (D) water (5% of V) followed by concentrated nitric acid ($HNO_3$, 65%, 5% of V). The mixture is transferred to the volumetric flask. The solution diluted with D water up to the final volume, V, and left to stabilise for two hours.

The elemental analysis of the aqueous samples are run at room temperature using a Thermo Elemental iCAP 6300 Inductively Coupled Plasma—Optical Emission Spectrometer (ICP-OES). The instrument is calibrated for Al, Ti and Mg using a blank (a solution of 5% $HNO_3$), and 6 standards of 0.5 ppm, 1 ppm, 10 ppm, 50 ppm, 100 ppm and 300 ppm of Al, Ti and Mg in solutions of 5% $HNO_3$ DI water. Curve linear fitting and 1/concentration weighting is used for the calibration curve.

Immediately before analysis the calibration is verified and adjusted (instrument function named 'reslope') using the blank and a 300 ppm Al, 100 ppm Ti, Mg standard. A quality control sample (QC; 20 ppm Al and Ti, 50 ppm Mg in a solution of 5% HNO3 D water) is run to confirm the reslope. The QC sample is also run after every 5th sample and at the end of a scheduled analysis set.

The content of magnesium is monitored using the 285.213 nm and the content for titanium using 336.121 nm line. The content of aluminium is monitored via the 167.079 nm line, when Al concentration in test portion is between 0-10 wt-% and via the 396.152 nm line for Al concentrations above 10 wt-%.

The reported values are an average of three successive aliquots taken from the same sample and are related back to the original catalyst sample by inputting the original mass of test portion and the dilution volume into the software.

Internal Electron Donor Content—GC-FID

The sample consisting of dry catalyst powder is mixed so that a representative test portion can be taken. Approximately 60-90 mg of sample is sampled in inert atmosphere into a 20 ml volume crimp cap vial and exact weight of powder recorded.

The test solution consisting of the internal donor in dichloromethane is prepared by liquid-liquid extraction of sample, water and organic solvent as follows: The test portion is dissolved in a volume of 5 ml of dichloromethane. A solution consisting of the internal standard dimethyl pimelate (0.28 V/V-%) and deionised water is added in a volume of 1 ml using a precision microsyringe. The suspension is sonicated for 20 min and let settle for phases to separate. The organic phase is sampled and filtered using a 0.45 µm filter to instrument vials.

The measurement is performed on an Agilent 7890B Gas Chromatograph equipped with flame ionisation detector. The column used is a ZB-5HT Inferno 15 m×320 µm×0.25 µm with midpoint backflush through a three channel of auxiliary EPC and a pre column restriction capillary of 1.5 m×320 µm×0 µm. The oven holds an initial temperature of 40° C. and hold time of 3 min. The ramp program consists of a first rate of 5° C./min to 70° C. and second ramp of 40° C./min to 330° C. and third ramp of 20° C./min to 350° C. with a hold time of 1 min.

The inlet operates in split mode. Injection volume is 1 µL, inlet temperature 280° C., pressure 2.941 psi, total flow 19.8 mL/min and split ratio 20:1. Carrier gas is 99.995% He with pre column flow of 0.8 mL/min and additional flow from backflush EPC to analytical column of 1 mL/min. The FID Detector operates at 370° C. with $N_2$ makeup flow of 25 ml/min, synthesised air flow of 350 ml/min and hydrogen flow of 35 ml/min.

Signal from FID in chromatogram is integrated and calculated against a series of standardisation samples, using the response ratios between the signal for the internal donor and the internal standard dimethyl pimelate. Identity is determined by retention time. The standardisation for the internal donor has been performed with 4 standardisation solutions in a range of known masses of the internal donor corresponding to 7.68 mg to 19.11 mg normalised to 100 mg of sample and treated with the same sample preparation as the samples. The calibration curve for the response ratios is linear without sample concentration weighting. A quality control sample is used in each run to verify the standardisation. All test solutions are run in 2 replicate runs. The mass of the test portion is used for calculating the internal electron donor content for both replicates and the result reported as the average.

Particle Size Distribution—Automated Image Analysis

The sample consisting of dry catalyst powder is mixed so that a representative test portion can be taken. Approximately 50 mg of sample is sampled in inert atmosphere into a 20 ml volume crimp cap vial and exact weight of powder recorded. A test solution is prepared by adding white mineral oil to the powder so that the mixture holds a concentration of approximately 0.5-0.7 wt-%. The test solution is carefully mixed before taking a portion that is placed in a measuring cell suitable for the instrument. The measuring cell should be such that the distance of between two optically clean glasses is at least 200 µm.

The image analysis is run at room temperature on a Malvern Morphologi 3G system. The measuring cell is placed on a microscopy stage with high precision movement in all directions. The physical size measurement in the system is standardised against an internal grating or by using an external calibration plate. An area of the measuring cell is selected so that the distribution of the particles is representative for the test solution. This area is recorded in partially overlapping images by a CCD camera and images stored on a system specific software via a microscope that has an objective sufficient working distance and a magnification of five times. Diascopic light source is used and the illumination intensity is adjusted before each run. All images are recorded by using a set of 4 focal planes over the selected area. The collected images are analysed by the software where the particles are individually identified by comparison to the background using a material predefined greyscale setting. A classification scheme is applied to the individually identified particles, such that the collected population of particles can be identified to belong to the physical sample. Based on the selection through the classification scheme further parameters can be attributed to the sample.

The particle diameter is calculated as the circular equivalent (CE) diameter. The size range for particles included in the distribution is 6.8-200 μm. The distribution is calculated as a numerical moment-ratio density function distribution and statistical descriptors calculated based on the numerical distribution. The numerical distribution can for each bin size be recalculated for an estimate of the volume transformed distribution.

All graphical representations are based on a smothering function based on 11 points and the statistical descriptors of the population are based on the unsmothered curve. The mode is determined manually as the peak of the smothered frequency curve. Span is calculated as the (CE D[x, 0.9]−CE D[x, 0.1])/CE D[x, 0.5].

The following particle size and particle size distribution indicators have been used in the experiments:

$D90_{vol}$=a=the volumetric amount of particle diameter at 90% cumulative size, $D10_{vol}$=the volumetric amount of particle diameter at 10% cumulative size, $D50_{vol}$=the volumetric amount of particle diameter at 50% cumulative size (median particle size, vol)

$$SPAN_{vol}=(D90_{vol}-D10_{vol})/D50_{vol}$$

$D90_{num}$=the numerical amount of particles at 90% cumulative size, $D10_{num}$=the numerical amount of particles at 10% cumulative size, $D50_{num}$=the numerical amount of particles at 50% cumulative size (median particle size, numerical)

$$SPAN_{num}=(D90_{num}-D10_{num})/D50_{num}$$

Volumetric $Mode_{vol}$ and numerical $Mode_{num}$ particle size representing the particle size most commonly found in the distribution (by volumetric or numerical, resp.)

Melt Flow Rate $MFR_2$: 230° C., 2.16 kg load

The melt flow rate is measured in accordance with ISO 1133 and is indicated as g/10 min.

EXAMPLES

Raw Materials $TiCl_4$ (CAS 7550-45-90) was supplied by commercial source.

20% solution in toluene of butyl ethyl magnesium (Mg(Bu)(Et)), provided by Crompton 2-ethylhexanol, provided by Merck Chemicals 3-Butoxy-2-propanol, provided by Sigma-Aldrich bis(2-ethylhexyl)citraconate, provided by Contract Chemicals Viscoplex® 1-254, provided by Evonik Heptane, provided by Chevron

Example A: Preparation of Soluble Mg-Alkoxide and Mg Complex

A.1. Preparation of Soluble Mg-Alkoxide 3.4 litre of 2-ethylhexanol and 810 ml of propylene glycol butyl monoether (in a molar ratio 4/1) were added to a 20 l reactor. Then 7.8 litre of a 20% solution in toluene of BEM (butyl ethyl magnesium) provided by Crompton GmbH, were slowly added to the well stirred alcohol mixture. During the addition the temperature was kept at 10° C. After addition the temperature of the reaction mixture was raised to 60° C. and mixing was continued at this temperature for 30 minutes. Finally after cooling to room temperature the obtained Mg-alkoxide was transferred to a storage vessel.

A.2. Preparation of Mg Complex 21.2 g of Mg alkoxide prepared in Example A.1. was mixed with 4.0 ml of donor (bis(2-ethylhexyl) citraconate) for 5 min. After mixing the obtained Mg complex was used immediately in the preparation of the catalyst component.

Comparative Example 1 (CE1)

Preparation of Catalyst Component 13.0 ml of titanium tetrachloride was placed in a 100 ml Easy Max reactor equipped with a mechanical stirrer at 15° C. Mixing speed was adjusted to 500 rpm. 16.8 g of Mg-complex prepared in Example A.2 was added to $TiCl_4$ within 20 minutes keeping the temperature at 15° C. 0.7 ml of Viscoplex® 1-254 and 21.0 ml of heptane was added, whereby an emulsion was formed. Mixing (700 rpm) was continued for 30 minutes at 15° C., after which the reactor temperature was raised to 90° C. within 45 minutes. The reaction mixture was stirred for a further 30 minutes at 90° C. at 700 rpm. Afterwards stirring was stopped and the reaction mixture was allowed to settle for 15 minutes at 90° C. The solid material was washed 5 times: Washings were made at 80° C. under stirring for 20 min with 500 rpm with toluene, $TiCl_4$/donor mixture, toluene and twice with heptane. After stirring was stopped the reaction mixture was allowed to settle for 10-30 minutes and followed by siphoning between the washes.

After the last wash the temperature was decreased to 70° C. with subsequent siphoning, followed by $N_2$ purge for 60 minutes to yield an air sensitive powder.

The catalyst was isolated in the form of spherical microparticles. Catalyst analysis and morphological properties are disclosed in Table 1.

Comparative Example 2 (CE2)

Preparation of Catalyst Component

Catalyst component was prepared as in CE1, except that 16.8 g of the Mg alkoxide of Example A.1 was added to $TiCl_4$ and the donor was added to the mixture before heptane (9 ml). The catalyst was isolated in the form of spherical microparticles. Catalyst analysis and morphological properties are disclosed in Table 1.

Inventive Example 1 (IE1)

Preparation of Catalyst Component

Catalyst component was prepared as in CE2 but Viscoplex was added to the Mg-alkoxide. The catalyst was isolated in the form of spherical microparticles. Catalyst analysis and morphological properties are disclosed in Table 1.

Inventive Example 2 (IE2)

Preparation of Catalyst Component

Catalyst was prepared as in CE2, but 25% of the donor was added to the Mg-alkoxide before adding to TiCl$_4$, and 75% of the donor was added as in CE2.

The catalyst was isolated in the form of spherical microparticles. Catalyst analysis and morphological properties are disclosed in Table 1.

Comparative Example 3 (CE3)

The solid catalyst component was prepared otherwise according to Example 8 of WO 2004/029112, except that diethylaluminium chloride was used as an aluminium compound instead of triethylaluminium.

TABLE 1

|  | CE1 | CE2 | IE1 | IE2 | CE3 |
| --- | --- | --- | --- | --- | --- |
| Ti/wt % | 3.3 | 2.4 | 3.3 | 2.9 | 2.5 |
| Mg/wt % | 15.0 | 12.0 | 15.4 | 14.8 | 12.2 |
| Donor/wt % | 25.8 | 20.6 | 24.3 | 24.5 | 21.0 |
| D50$_{vol}$/μm | 46.8 | 32.1 | 24.3 | 40.2 | 53.3 |
| D90$_{vol}$/μm | 72.5 | 39.9 | 45.4 | 71.1 | 73.6 |
| D10$_{vol}$/μm | 22.2 | 20.3 | 19.4 | 31.8 | 29.0 |
| SPAN$_{vol}$ | 1.07 | 0.61 | 1.07 | 0.98 | 0.84 |
| D50$_{num}$/μm | 16.9 | 22.0 | 21.7 | 35.8 | 22.2 |
| D90$_{num}$/μm | 39.1 | 34.1 | 26.8 | 43.9 | 50.8 |
| D10$_{num}$/μm | 9.0 | 13.3 | 17.2 | 26.6 | 10.4 |
| SPAN$_{num}$ | 1.79 | 0.95 | 0.45 | 0.48 | 1.82 |
| Mode$_{vol}$/μm | 52.8 | 35.5 | 24.1 | 41.2 | 60.6 |
| Mode$_{num}$/μm | 17.8 | 31.2 | 21.2 | 36.6 | 17.4 |
| Mode$_{num}$/Mode$_{vol}$ | 0.34 | 0.88 | 0.88 | 0.88 | 0.28 |

Polymerisation

A 5 litre stainless steel reactor was used for propylene polymerisations.

About 0.9 ml triethyl aluminium (TEA) (from Witco, used as received) as a co-catalyst, ca 0.13 ml dicyclopentyl dimethoxy silane (DCDS) (from Wacker, dried with molecular sieves) as an external donor and 30 ml n-pentane were mixed and allowed to react for 5 minutes. Half of the mixture was then added to the polymerisation reactor and the other half was mixed with about 20 mg of a catalyst. After additional 5 minutes the catalyst/TEA/donor/n-pentane mixture was added to the reactor. The Al/Ti ratio was 250 mol/mol and the Al/DCDS ratio was 10 mol/mol. 200 mmol hydrogen and 1400 g propylene were introduced into the reactor and the temperature was raised within ca 20 minutes to the polymerisation temperature (80° C.). The polymerisation time after reaching polymerisation temperature was 60 minutes, after which the polymer formed was taken out from the reactor. Polymerisation results are disclosed in Table 2.

Polymerisation results show that catalyst activities and melt flow rates remain, as was desired, on the same level in inventive examples and comparative examples 1 and 2, which shows that catalyst of the invention with excellent particle size distribution fulfils the polymerisation criteria. In comparative example 3 the values differ from the other examples, however, the catalyst differs essentially in morphological point of view, and the chemistry of said catalyst is different. As explained in the specification, reactor fouling and plugging will not be seen in the small scale polymerisation tests.

TABLE 2

|  | CE1 | CE2 | IE1 | IE2 | CE3 |
| --- | --- | --- | --- | --- | --- |
| Activity/ kg/gcat | 26.0 | 25.7 | 28.3 | 23.3 | 32.2 |
| MFR$_2$/ g/10 min | 10.3 | 12.3 | 12.6 | 12.7 | 6.0 |

What is claimed is:

1. A Ziegler-Natta catalyst component in the form of solid particles having a median particle size (D50$_{vol}$) of 5 to 200 μm and comprising
    i) a compound of Group 1 to 3 metal, IUPAC, Nomenclature of Inorganic Chemistry, 1989
    ii) a compound of a transition metal of Group 4 to 10, or of a lanthanide or actinide, IUPAC, Nomenclature of Inorganic Chemistry, 1989 and
    iii) an internal electron donor,
    wherein the solid particles have a numerical SPAN (SPAN$_{num}$) of 0.60 or below and a ratio of numerical mode to volumetric mode (Mode$_{num}$/Mode$_{vol}$) of 0.80 or more and wherein Mode$_{num}$<Mode$_{vol}$.

2. The Ziegler-Natta catalyst component according to claim 1, wherein SPAN$_{num}$ is 0.50 or below.

3. The Ziegler-Natta catalyst component according to claim 1, wherein the ratio of Mode$_{num}$/Mode$_{vol}$ is 0.85 or more.

4. The Ziegler-Natta catalyst component according to claim 1, wherein the catalyst particles have a surface area of below 20 m2/g.

5. The Ziegler-Natta catalyst component according to claim 1, wherein the compound of Group 1 to 3 is a Group 2 metal that is magnesium and the transition metal compound of Group 4 to 10, or of a lanthanide or actinide is a compound of Group 4 to 6.

6. The Ziegler-Natta catalyst component according to claim 1, wherein the internal electron donor is selected from (di)esters of non-phthalic carboxylic (di)acids, 1,3-diethers, and mixtures thereof.

7. The Ziegler-Natta catalyst component according to claim 1, wherein the amount of Ti is in the range of 1-6 wt-%, the amount of Mg is in the range of 10 to 20 wt-% and the amount of the internal donor is in the range of 10 to 40 wt-% in the catalyst component.

8. The Ziegler-Natta catalyst component according to claim 1, wherein the Ziegler-Natta catalyst component is obtained without any particle screening step.

9. A process for producing a Ziegler-Natta catalyst component in the form of solid particles as defined in claim 1 comprising the steps:
    a) providing a solution of at least one Group 2 metal alkoxide,
    b) providing a solution of at least one compound of a transition metal of Group 4 to 10, or of a lanthanide or actinide,
    c) adding the solution from step a) to the solution of step b) and
    d) recovering the solid catalyst component particles, wherein an internal electron donor or precursor thereof is added at any step prior to the recovery step d), provided that at least part of the whole amount of the internal electron donor or precursor thereof is added in step b), during step c) or after completing step c), and wherein the catalyst component in the form of solid particles has a numerical SPAN of 0.60 or below and has a ratio of a numerical mode to a volumetric mode ($Mode_{num}/Mode_{vol}$) of 0.80 or more and wherein $Mode_{num} < Mode_{vol}$;

wherein (i) a first part of the internal electron donor is added to the solution of step a) and a second part of the solution of step b) or during step c) or after completing step c);

and/or (ii) a surfactant is added to the solution of step a).

10. The process according to claim 9, wherein the Ziegler-Natta catalyst component in the form of solid particles is obtained without any particle screening step.

11. The process according to claim 10, wherein the catalyst component in the form of solid particles is prepared by a precipitation or by an emulsion-solidification method.

12. The process according to claim 9 comprising steps:
a) providing a solution of
 a1) at least a Group 2 metal alkoxy compound (Ax) being the reaction product of a Group 2 metal compound and an alcohol (A) comprising in addition to the hydroxyl moiety at least one ether moiety optionally in an organic liquid reaction medium; or
 a2) at least a Group 2 metal alkoxy compound (Ax') being the reaction product of a Group 2 metal compound and an alcohol mixture of the alcohol (A) and a monohydric alcohol (B) of formula ROH, optionally in an organic liquid reaction medium; or
 a3) a mixture of the Group 2 metal alkoxy compound (Ax) and a Group 2 metal alkoxy compound (Bx) being the reaction product of a Group 2 metal compound and the monohydric alcohol (B), optionally in an organic liquid reaction medium; or
 a4) Group 2 metal alkoxy compound of formula $M(OR_1)_n(OR_2)_m X_{2-n-m}$ or mixture of Group 2 alkoxides $M(OR_1)_n X_{2-n'}$ and $M(OR_2)_m X_{2-m'}$, where M is Group 2 metal, X is halogen, $R_1$ and $R_2$ are different alkyl groups of $C_2$ to $C_{16}$ carbon atoms, and $0 \leq n < 2$, $0 \leq m < 2$ and $n+m \leq 2$, provided that both n and m are not simultaneously zero, $0 < n' < 2$ and $0 < m' \leq 2$; and b) providing a solution of at least one compound of a transition metal of Group 4 to 6,
c) adding the solution from step a) to the solution of step b) and
d) recovering the solid catalyst component particles, wherein an internal electron donor or precursor thereof is added at any step prior to the recovery step d), provided that at least part of the whole amount of the internal electron donor or precursor thereof is added in step b), during step c) or after completing step c);

wherein (i) a first part of the internal electron donor is added to the solution of step a) and a second part of the solution of step b) or during step c) or after completing step c); and/or (ii) a surfactant is added to the solution of step a).

13. The process according to claim 9, wherein the Group 2 metal is magnesium and the transition metal compound of Group 4 to 6, a titanium compound.

14. The process according to claim 9, wherein the internal electron donor is selected from (di)esters of non-phthalic carboxylic (di)acids, 1,3-diethers, and mixtures thereof.

15. A Ziegler-Natta catalyst comprising a Ziegler-Natta catalyst component in the form of solid particles as defined in claim 1 and a cocatalyst of a compound of Group 13 metal and optionally an external electron donor.

16. A method comprising producing C2 to C10 α-olefin polymers with the Ziegler Natta catalyst of claim 15.

17. A polymerisation process comprising polymerising C2 to C10 α-olefin, optionally with comonomers, in the presence of the catalyst component as defined in claim 1 under polymerisation conditions to produce C2 to C10 α-olefin polymer or copolymers thereof.

18. A Ziegler-Natta catalyst comprising a Ziegler-Natta catalyst component prepared by the process as defined in claim 9 and a cocatalyst of a compound of Group 13 metal and optionally an external electron donor.

19. A method comprising producing C2 to C10 α-olefin polymers with the Ziegler Natta catalyst of claim 18.

20. A polymerisation process comprising polymerising C2 to C10 α-olefin, optionally with comonomers, in the presence of the catalyst component produced according to the process as defined in claim 9, under polymerisation conditions to produce C2 to C10 α-olefin polymer or copolymers thereof.

* * * * *